US009057119B2

(12) United States Patent
Sutcliffe et al.

(10) Patent No.: US 9,057,119 B2
(45) Date of Patent: Jun. 16, 2015

(54) METHOD OF OXIDATIVE LEACHING OF MOLYBDENUM—RHENIUM SULFIDE ORES AND/OR CONCENTRATES

(75) Inventors: Matthew Leslie Sutcliffe, Kerikeri (NZ); Garry Mervyn Johnston, Claremont (AU); Nicholas James Welham, Ballarat (AU)

(73) Assignee: Metaleach Limited, Tortola (VG)

( * ) Notice: Subject to any disclaimer, the term of this patent is extended or adjusted under 35 U.S.C. 154(b) by 151 days.

(21) Appl. No.: 13/634,685

(22) PCT Filed: Mar. 3, 2011

(86) PCT No.: PCT/AU2011/000243
§ 371 (c)(1), (2), (4) Date: Nov. 16, 2012

(87) PCT Pub. No.: WO2011/113080
PCT Pub. Date: Sep. 22, 2011

(65) Prior Publication Data
US 2013/0133485 A1    May 30, 2013

(30) Foreign Application Priority Data
Mar. 18, 2010   (AU) .................. 2010901139

(51) Int. Cl.
*C22B 3/06*    (2006.01)
*C22B 34/34*   (2006.01)
*C22B 61/00*   (2006.01)

(52) U.S. Cl.
CPC . *C22B 34/34* (2013.01); *C22B 3/06* (2013.01); *C22B 61/00* (2013.01)

(58) Field of Classification Search
CPC ............ C22B 3/10; C22B 34/34; C22B 59/00

USPC ........................................ 75/743
See application file for complete search history.

(56) References Cited

U.S. PATENT DOCUMENTS 4,321,089 A    3/1982   Kruesi et al.

FOREIGN PATENT DOCUMENTS

| CN | 1386870 A | 12/2002 |
|---|---|---|
| RU | 1314569 C | * 10/1994 |
| RU | 2027789 C1 | 1/1995 |

OTHER PUBLICATIONS

Machine translation of RU 1314569 published Oct. 30, 1994.*
International Search Report for PCT/AU2011/000243, ISA/AU, Woden ACT, AU, mailed Apr. 18, 2011.

* cited by examiner

*Primary Examiner* — George Wyszomierski
*Assistant Examiner* — Tima M McGuthry Banks
(74) *Attorney, Agent, or Firm* — Harness, Dickey & Pierce, PLC (57) ABSTRACT

A method for leaching molybdenum and/or rhenium from a sulfide ore and/or concentrate containing such, the method comprising the steps of: Exposing the ore and/or concentrate to an aqueous solution of chlorine-based oxidizing species in which the sum of the concentrations of hypochlorite and hypochlorous acid is at least 10 mol % of the chlorine-based oxidizing species; Allowing and/or facilitating the oxidation of the molybdenum and/or rhenium by the hypochlorite and/or hypochlorous acid, thereby decreasing the pH such that the predominant chlorine-based oxidizing species becomes chlorine; Allowing and/or facilitating the oxidation of the molybdenum and/or rhenium by the chlorine thereby producing a pregnant leach solution; and Passing the pregnant leach solution to a means for metal recovery.

8 Claims, 4 Drawing Sheets

METHOD OF OXIDATIVE LEACHING OF MOLYBDENUM—RHENIUM SULFIDE ORES AND/OR CONCENTRATES

CROSS-REFERENCE TO RELATED APPLICATIONS

This application is a 371 U.S. National Stage of International Application No. PCT/AU2011/000243, filed Mar. 3, 2011, which claims priority to Australian Patent Application No. 2010901139, filed Mar. 18, 2010. The disclosures of the above applications are incorporated herein by reference.

FIELD OF THE INVENTION

The present invention relates to a method of leaching of molybdenum and/or rhenium from sulfide ores and/or concentrates containing such. More particularly, the method of leaching of the present invention utilises a chlorine-based oxidising species.

BACKGROUND ART

Molybdenite ($MoS_2$) is a fairly widespread mineral but occurs in very few economic deposits of its own. Most commonly it is present as an accessory mineral in copper sulphide ores, such as those in porphyry deposits. For both types of deposit, the standard method for recovery is to grind the ore such that the minerals are liberated from the gangue and treat using froth flotation. As the molybdenite and copper minerals are both sulphides, a rougher float is used to recover both metals into a concentrated slurry from which they are then separated by selective flotation. The separation is not perfect and copper minerals remain in the molybdenite concentrate and molybdenite remains in the copper concentrate.

The copper concentrate is typically sent for smelting where the molybdenum reports to the slag and is not recovered. The molybdenum concentrate is typically roasted in air to convert the sulphide to the oxide $MoO_3$. The roasting process also results in the formation of volatile $Re_2O_7$ which is either lost or scrubbed from the off gases. Regardless, a portion of the rhenium is lost. Further, roasting inevitably produces sulphur dioxide which is becoming an environmentally unacceptable product. The comparatively small scale of molybdenite roasting makes conversion to sulphuric acid, expensive as the acid plant is small. The $MoO_3$ is then leached in acid, the impurities are removed and then the molybdenum is precipitated as ammonium molybdate $(NH_4)_2MoO_4$ from which the metal can be produced by hydrogen reduction.

Roasting is becoming increasingly unacceptable and expensive due to the necessity to capture all of the sulphur dioxide emissions. Additionally, the loss of rhenium results in financial losses from a potentially very valuable by-product.

An alternate approach is to leach molybdenum directly from unroasted ore. A previous work, (Extractive Metallurgy of Molybdenum, C. K. Gupta, CRC Press, 1992, p. 162-171) summarises work on leaching agents for molybdenite. Ozone does not react with molybdenite under ambient temperature and pressure, only at elevated temperature and/or pressure which may require an autoclave. Acidic permanganate solution reacts but the reaction is hindered by precipitation on the surface of the molybdenite unless the solution is extremely acidic (>2N $H_2SO_4$). Sulphuric acid solution with the addition of solid manganese dioxide has been used to oxidise molybdenite, but the reaction is slow. Sodium persulphate requires the presence of a catalyst such as silver ions which increases the cost of essential reagents. Dilute nitric acid oxidises molybdenite slowly, but the reaction is limited, unless the solution is acidified with sulphuric acid to dissolve the reaction product.

Chlorine dioxide $ClO_2$ in water works rapidly, however $ClO_2$ is explosive and this necessitates using a low solution concentration. Low oxidant concentration will result in a low slurry density thereby requiring substantially larger leach tanks to give the required residence time. Such a leaching process will lead to very low molybdenum concentrations in solution and require a much larger, and therefore more expensive, plant than a process which runs at higher slurry density.

Acid sodium chlorate $NaClO_3$ has a slow reaction rate unless the chlorate and acid concentrations are both high. The necessity for a low pH leads to problems with losses of oxidant as intermediates formed during the reaction include chlorine which has limited solubility.

Aerated sodium hydroxide also oxidises molybdenite but is extremely slow.

Sodium hypochlorite, a chlorine-based oxidising species, was considered in the publication to be a potentially good reagent, provided it could be recycled. As an example, an electroxidation process in which a slurry of molybdenite in brine is pumped into an electrochemical cell at 35-40° C. has been described. At the anode the chloride ions are oxidised at the anode to hypochlorite/hypochlorous acid/chlorine depending upon the operating pH (G. H. Kelsall, N. J. Welham and M. A. Diaz 'Thermodynamics of Cl—$H_2O$, Br—$H_2O$, I—$H_2O$, Au—Cl—$H_2O$, Au—Br—$H_2O$ and Au—I—$H_2O$ systems at 298 K', Journal of Electroanalytical Chemistry, 361(1-2), 1993, 13-24.). There is also further oxidation to chlorate $ClO_3^-$ ions which do not react with molybdenite unless the solution is acidic. The chlorine bearing species then reacts with the molybdenite according to:

$$MoS_2 + 9NaClO + 3H_2O = MoO_4^{2-} + 9NaCl + 2SO_4^{2-} + 6H^+$$

Unfortunately, the stability of the hypochlorite decreases with both temperature and pH. Thus using an elevated temperature and allowing the solution to decrease in pH through the inevitable production of protons during reaction both increase the losses of oxidant increasing costs. However, these losses are avoided by maintaining the solution pH through the addition of a base (lime or hydroxide). However, this in turn increases cost and complexity of the subsequent solution chemistry by adding additional metal ions.

The outlined process is only viable on sulphide concentrates and requires heated tanks for the leaching. Further, this process relies on the feed solutions of sodium chloride being of extremely high purity, if Mg or Ca is present then precipitation of their hydroxides occurs, significantly increasing the power consumption per kilogram of product. The high level of impurities being recycled in the envisaged electrolytic process would inevitably lead to reduced power efficiency for hypochlorite generation and increasing costs for the process.

A process to selectively remove molybdenite from copper concentrates has been outlined (I. H. Warren, D. M. Mounsey, Factors influencing the selective leaching of molybdenum with sodium hypochlorite from copper/molybdenum sulphide minerals, Hydrometallurgy, 10, 1983, 343-357). A hypochlorite solution was adjusted to the required pH using hydrochloric acid, the molybdenite concentrate was then added and the pH maintained automatically by the addition of 2 M NaOH using a pH-controlled solenoid valve. It was found that a pH of 9 was optimum. To avoid the need to continuously add sodium hydroxide, carbonate ions were added to act as a pH buffer. Using this buffer was only viable as the slurry density of the solution was sufficiently low to not produce enough protons to overcome the buffer capacity. The use of such a buffer would not be viable on an industrial scale unless it operated at the same low slurry density. This would greatly enlarge the necessary plant due to the higher volumes of solution required. The final solution would also be low in molybdenum concentration and remain buffered around pH 9. The low concentration would make efficient recovery of the molybdenum more difficult than from a higher concentration solution. The buffering would require the use of further reagents to adjust pH to those where molybdenum recovery processes were optimal. The necessarily large solution volume required will also need to be recycled back to the leach stage after the molybdenum has been recovered. This would require the addition of base to regenerate the buffering effect. The overall process is not especially efficient as there is a need to regenerate the carbonate buffer.

It is unlikely that the use of a carbonate buffer is economically viable due to the problems outlined above. In an industrial process the addition of base would be more economically viable as it would be capable of handling higher slurry densities during the leaching.

Two papers from BARC (T. K. Mukherjee, P. R. Menon, P. P. Shukla and C. K. Gupta, Recovery of molybdenum metal powder from a low grade molybdenite concentrate, Chemeca 88, Australia's Bicentennial International Conference for the Process Industries, Sydney, 28-31 Aug. 1988, p. 548-554; V. S. Bhave, P. Alex, R. C. Hubli and A. K. Sun, Indirect electro-oxidation process for leaching of molybdenite concentrate by hypochlorite: a modified approach, BARC Newsletter, 297, October 2008, 139-143) outline a process operating at 30-35° C. and pH 6-8 using sodium carbonate addition to maintain this pH. During prolonged oxidation chlorate ions $ClO_3^-$ ions build up consuming power and reducing the available free chloride which can be oxidised to chlorine at the anode. The latter paper used calcium carbonate to adjust pH, this resulted in the precipitation of calcium molybdate which was subsequently recovered and further processed to recover the molybdenum.

All the electro-oxidation methods maintain the pH, by way of neutralising agents, to minimise the loss of hypochlorite ions.

Throughout this specification, unless the context requires otherwise, the word "comprise", or variations such as "comprises" or "comprising", will be understood to imply the inclusion of a stated integer or group of integers but not the exclusion of any other integer or group of integers The discussion of the background art is included exclusively for the purpose of providing a context for the present invention. It should be appreciated that the discussion is not an acknowledgement or admission that any of the material referred to was common general knowledge in the field relevant to the present invention in Australia or elsewhere before the priority date.

DISCLOSURE OF THE INVENTION

In accordance with the present invention there is provided a method for leaching molybdenum and/or rhenium from a sulfide ore and/or concentrate containing such, the method comprising the steps of:
Exposing the ore and/or concentrate to an aqueous solution of chlorine-based oxidising species in which the sum of the concentrations of hypochlorite and hypochlorous acid is at least 10 mol % of the chlorine-based oxidising species;
Allowing and/or facilitating the oxidation of the molybdenum and/or rhenium by the hypochlorite and/or hypochlorous acid, thereby decreasing the pH such that the predominant chlorine-based oxidising species becomes chlorine;
Allowing and/or facilitating the oxidation of the molybdenum and/or rhenium by the chlorine thereby producing a pregnant leach solution; and
Passing the pregnant leach solution to a means for metal recovery.

In a preferred form of the invention, the step of exposing the ore and/or concentrate to an aqueous solution of chlorine-based oxidising species in which the predominant chlorine-based oxidising species is hypochlorite or hypochlorous acid more specifically comprises:
Exposing the ore and/or concentrate to an aqueous solution of chlorine-based oxidising species in which at least 10 mol % of the chlorine-based oxidising species is hypochlorite.

Preferably, at least 20 mol % of the chlorine-based oxidising species is hypochlorite. Preferably, at least 30 mol % of the chlorine-based oxidising species is hypochlorite. Preferably, at least 40 mol % of the chlorine-based oxidising species is hypochlorite. Preferably, at least 50 mol % of the chlorine-based oxidising species is hypochlorite. Preferably, at least 60 mol % of the chlorine-based oxidising species is hypochlorite. Preferably, at least 70 mol % of the chlorine-based oxidising species is hypochlorite. Preferably, at least 80 mol % of the chlorine-based oxidising species is hypochlorite. Preferably, at least 90 mol % of the chlorine-based oxidising species is hypochlorite. In one form of the invention, in excess of 90 mol % of the chlorine-based oxidising species is hypochlorite. In a preferred form of the invention, hypochlorite ion comprises at least 95 mol % of the chlorine-based oxidising species. In a preferred form of the invention, hypochlorite ion comprises 99 mol % of the chlorine-based oxidising species, on a molar basis.

The inventors have discovered that exposure of the ore and/or concentrate to hypochlorite ions, even for a brief period, enables improved recovery of molybdenum and/or rhenium than observed when exposed to chlorine-based oxidising agents under conditions when chlorine predominates.

Without wishing to be bound by theory, the inventors believe that exposure of the sulfide ore and/or concentrate to hypochlorous acid or hypochlorite ion diminishes the formation of a passivating layer that may be responsible for the lower recoveries reported with chlorine leaching at low pH.

Furthermore, the method of the present invention includes oxidation by chlorine, as distinct from prior art methods when the production of chlorine is avoided by the introduction of costly neutralising agents.

The pregnant leach solution emerging from the process of the present invention will have a pH similar to that of solutions obtained from leaching conventional roasted molybdenite. Consequently, well established processes can be used to effect separation and recovery of the molybdenum and rhenium.

Temperature and Pressure
In a preferred form of the invention, the steps of:
Exposing the ore and/or concentrate to an aqueous solution of chlorine-based oxidising species in which the predominant chlorine-based oxidising species is hypochlorite or hypochlorous acid;
Allowing and/or facilitating the oxidation of the molybdenum and/or rhenium by the hypochlorite and/or hypochlorous acid, thereby decreasing the pH such that the predominant chlorine-based oxidising species becomes chlorine; and Allowing and/or facilitating the oxidation of the molybdenum and/or rhenium by the chlorine thereby producing a pregnant leach solution;

are performed at ambient temperature.

In one form of the invention, the steps of:

Exposing the ore and/or concentrate to an aqueous solution of chlorine-based oxidising species in which the predominant chlorine-based oxidising species is hypochlorite or hypochlorous acid;

Allowing and/or facilitating the oxidation of the molybdenum and/or rhenium by the hypochlorite and/or hypochlorous acid, thereby decreasing the pH such that the predominant chlorine-based oxidising species becomes chlorine; and Allowing and/or facilitating the oxidation of the molybdenum and/or rhenium by the chlorine thereby producing a pregnant leach solution;

are performed at atmospheric pressure.

In one form of the invention, the steps of:

Exposing the ore and/or concentrate to an aqueous solution of chlorine-based oxidising species in which the predominant chlorine-based oxidising species is hypochlorite or hypochlorous acid;

Allowing and/or facilitating the oxidation of the molybdenum, and/or rhenium by the hypochlorite and/or hypochlorous acid, thereby decreasing the pH such that the predominant chlorine-based oxidising species becomes chlorine; and Allowing and/or facilitating the oxidation of the molybdenum and/or rhenium by the chlorine thereby producing a pregnant leach solution;

are performed at ambient temperature and atmospheric pressure.

A process that enables recoveries at ambient temperatures may be cost effectively used on ore as well as concentrate, as there is no requirement to heat the whole ore which contains <0.5% molybdenum thereby saving significant amounts of energy. The ambient temperature and pressure process may make it economically possible to heap leach molybdenite from ores which cannot otherwise be processed economically due to the high cost of crushing, grinding, flotation, roasting and dissolution.

The present invention encompasses the simultaneous use of chlorine based oxidising species in combination with complementary oxidising species. These complementary species may be present within the ore or may be deliberately added during one, or more, stages of the process. In another form of the invention, the complementary oxidising species is oxygen. As would be clear to those skilled in the art, combinations of complementary oxidants may be used.

Treatment of Ore and/or Concentrate

In a preferred form of the invention, the ore and/or concentrate exposed to the aqueous solution of chlorine-based oxidising species in which the sum of the concentrations of hypochlorite and hypochlorous acid is at least 10 mol % of the chlorine-based oxidising species is previously unleached.

In a preferred form of the invention, the ore and/or concentrate exposed to the aqueous solution of chlorine-based oxidising species in which the sum of the concentrations of hypochlorite and hypochlorous acid is at least 10 mol % of the chlorine-based oxidising species is previously unroasted.

In another preferred form of the invention, the ore and/or concentrate exposed to the aqueous solution of chlorine-based oxidising species in which the sum of the concentrations of hypochlorite and hypochlorous acid is at least 10 mol % of the chlorine-based oxidising species is previously unoxidised.

Nomenclature

As would be understood by a person skilled in the art, hypochlorite ions are also known as chlorate(I) ions and has a molecular formula of $ClOC^-$.

As would be understood by a person skilled in the art, hypochlorous acid is also known as chloric (I) acid, hydrogen hypochlorous acid and hydrogen chlorate (I), and has a molecular formula of HClO (or HOCl).

As would also be understood by a person skilled in the art, the term chlorine used alone refers specifically to the $Cl_2$ species.

As will be apparent to a person skilled in the art, the term sulfide ores should not be understood to be restricted to ores in which sulfur is the only non-metallic element, and encompasses ores additionally containing, for example, arsenides, tellurides, selenides, antimonides and mixtures thereof.

Reaction Vessels

In a preferred form of the invention, the step of:

Allowing and/or facilitating the oxidation of the molybdenum and/or rhenium by the chlorine thereby producing a pregnant leach solution;

is undertaken in a closed reaction vessel.

In a preferred form of the invention, the step of:

Allowing and/or facilitating the oxidation of the molybdenum and/or rhenium by the hypochlorite and/or hypochlorous acid, thereby decreasing the pH such that the predominant chlorine-based oxidising species becomes chlorine;

is undertaken in a closed reaction vessel.

In a highly preferred form of the invention, both the steps of:

Allowing and/or facilitating the oxidation of the molybdenum and/or rhenium by the hypochlorite and/or hypochlorous acid, thereby decreasing the pH such that the predominant chlorine-based oxidising species becomes chlorine; and Allowing and/or facilitating the oxidation of the molybdenum and/or rhenium by the chlorine thereby producing a pregnant leach solution;

take place in a dosed reaction vessel.

However, because the losses due to chlorine exsolution where the predominant chlorine-based oxidising species is hypochlorite ions or hypochlorous acid are considerably reduced, the method step of exposing the ore and/or concentrate to an aqueous solution of chlorine-based oxidising species in which the sum of the concentrations of hypochlorite and hypochlorous acid is at least 10 mol % of the chlorine-based oxidising species need not be performed in a closed reaction vessel. For example, the method step may be performed by heap leaching or atmospheric pressure leaching in an open vessel.

Retention Times

The period for which the ore and/or concentrate is exposed to the aqueous solution of chlorine-based oxidising species in which the sum of the concentrations of hypochlorite and hypochlorous acid is at least 10 mol % of the chlorine-based oxidising species prior to exposure to chlorine may be controlled by controlling the pH of the aqueous solution. This may be done by the addition of base, and/or controlling the pH to thereby control sulfate production.

As would be recognised by those skilled in the art, the alkaline hypochlorite ion containing solution may also be used to control pH whilst adding further hypochlorite ions.

The preferred period for which the ore and/or concentrate is exposed to the aqueous solution of chlorine-based oxidising species in which the hypochlorite ion comprise at least 10 mol % of the chlorine-based oxidising species prior to exposure to hypochlorous acid/chlorine will vary with mineralogy of the ore or concentrate. However, as will be evident from the following examples, even brief exposures may provide advantageous results.

Recovery of Other Metals

The method of the present invention may form part of a process by which metals other than the target metals are additionally recovered. For example, the method of the present invention may be utilised to reduce the molybdenum concentration in a copper concentrate prior to the concentrate being further processed to recover the copper.

The means for metal recovery of the present invention may comprise one or more solvent extraction stages, optionally followed by electrowinning or precipitation.

Concentration of Chlorine-Based Oxidising Species

As will be recognised by those skilled in the art the concentration of chlorine-based oxidising species will vary according to the concentration of the molybdenite in the ore or concentrate and the presence of other oxidising agent consuming minerals present in the ore or concentrate.

Regenerating Aqueous Solution of Chlorine-Based Oxidising Species in which the Sum of the Concentrations of Hypochlorite and Hypochlorous Acid is at Least 10 mol % of the Chlorine-Based Oxidising Species Although the method of the present invention may, in many circumstances, be operated economically without any need to recycle the aqueous solution of chlorine-based oxidising species in which the sum of the concentrations of hypochlorite and hypochlorous acid is at least 10 mol % of the chlorine-based oxidising species, under some circumstances it may be economically or environmentally desirable to do so. In areas with strict environmental controls on saline discharges it is prudent to maximise the recycle of the chloride within the process. In one form of the invention, this is achieved by recirculating the target-metal-depleted-solution after metals separation to a hypochlorite generator. In alternate forms of the invention, this is achieved by allowing or enhancing the evaporation of water from the same target-metal-depleted-solution thereby crystallising a chloride salt which is recycled back to a hypochlorite generator.

BRIEF DESCRIPTION OF THE DRAWINGS

The present invention will now be described, by way of example only, with reference to two embodiments thereof and the accompanying drawings, in which.

BEST MODE(S) FOR CARRYING OUT THE INVENTION

Figure 1:
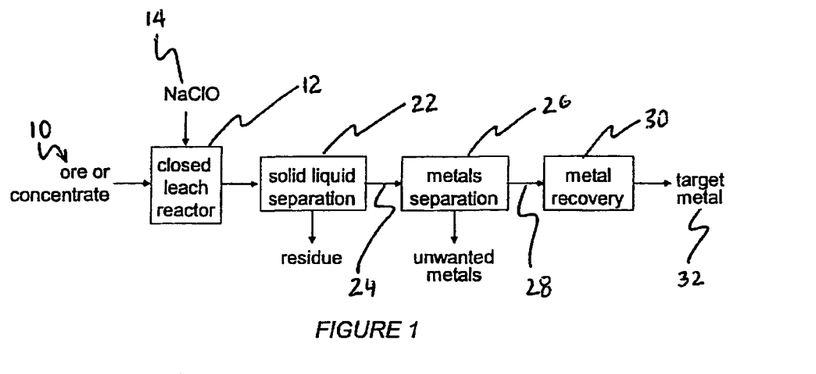
FIG. 1 is a schematic flow sheet of a method for leaching one or more of the target metals from a sulfide ore and/or concentrate in accordance with a first embodiment of the present invention.

Referring now to FIG. 1, a sulfide ore or concentrate 10 containing molybdenum and/or rhenium, such as molybdenite, is introduced into a closed leach vessel 12. An aqueous solution containing hypochlorite ions 14 is introduced into the leach vessel 12, such that the ore is exposed, for a predetermined period, to an aqueous solution of chlorine-based oxidising species in which the sum of the concentrations of hypochlorite and hypochlorous acid is at least 10 mol % of the chlorine-based oxidising species in the form of an aqueous solution in which the predominant chlorine-based oxidising species are hypochlorite ions. As a result of the consequent reduction in pH, the ore is then exposed, within the same closed leach vessel 12, to an aqueous solution in which the predominant chlorine-based oxidising species is hypochlorous acid and, if the pH decreases sufficiently, to an aqueous solution in which the predominant chlorine-based oxidising species is chlorine.

After a predetermined leach period, the slurry is transferred to a solid-liquid separation phase 22, and the pregnant leach solution containing target metal ions 24 transferred to a metal separation stage 26, such as solvent extraction, ion exchange, selective precipitation, and/or cementation, whereby non-target metals are separated from the pregnant leach solution containing target metal ions 24. The resulting target metal solution 28 is then transferred to a metal recovery stage 30, such as cementation, gaseous reduction, compound precipitation, crystallisation and/or electrowinning, yielding the target metal 32.

Figure 2:
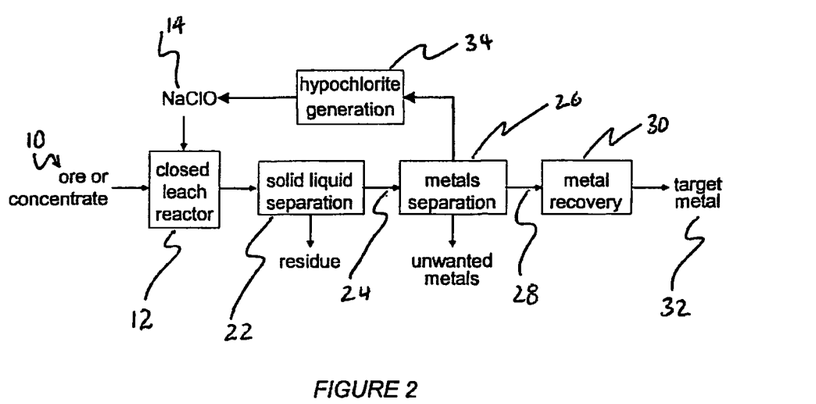
FIG. 2 is a schematic flow sheet of a method for leaching one or more of the target metals from a sulfide ore and/or concentrate in accordance with a second embodiment of the present invention.

The embodiment of the invention represented by FIG. 2 is substantially similar to that represented by FIG. 1, and like numbers will be used to represent like parts. However, unlike the embodiment depicted in FIG. 1, the embodiment depicted in FIG. 2 incorporates a hypochlorite recycling facility 34, which receives spent solution from the metal separation stage 26 and regenerates a solution enriched in hypochlorite ion which is in turn utilised in the leach vessel 12.

EXAMPLES

The utility of the present invention will now be demonstrated by reference to a series of examples. The examples should not be understood as in any way limiting the generality of the preceding description of the invention.

Example 1

A sample of molybdenite flotation concentrate (~50% Mo) was leached at a wide range of starting pH for 1 h. Approximately 0.25 g of concentrate was mixed with 25 mL of pH adjusted ~25 g/L NaClO solution and shaken. After 1 h the sample was centrifuged, the pH measured and the solution decanted for analysis by AAS.

Figure 3:
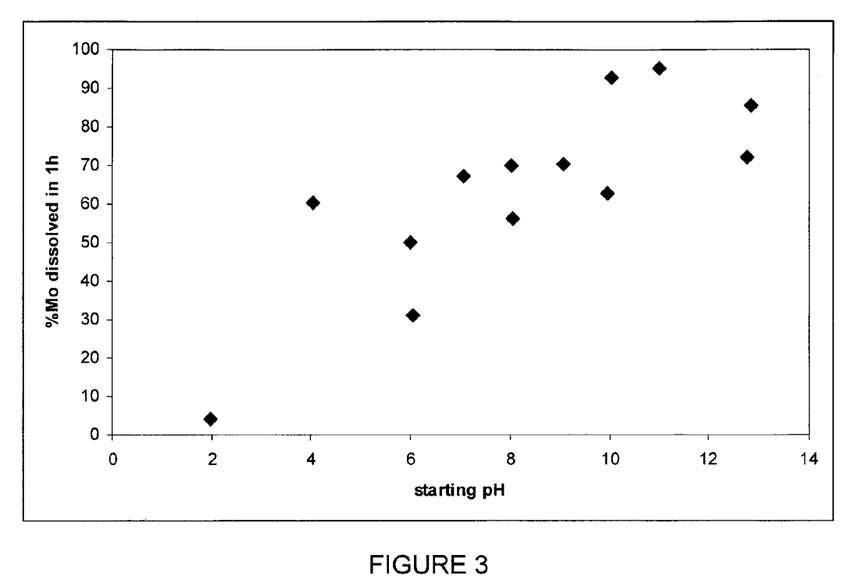
FIG. 3 is a graphical representation of the molybdenum dissolution of samples of Example 1.

The molybdenum dissolution is shown in FIG. 3. Clearly, the starting pH is of great importance in the extent of recovery with higher pH tending to give high recoveries.

Without wishing to be bound by theory, the inventors believe that exposure of the sulfide ore and/or concentrate to hypochlorite-hypochlorous acid-containing solution diminishes the formation of a passivating layer that may be responsible for the lower recoveries clearly evident at low pH where chlorine predominates.

Figure 4:
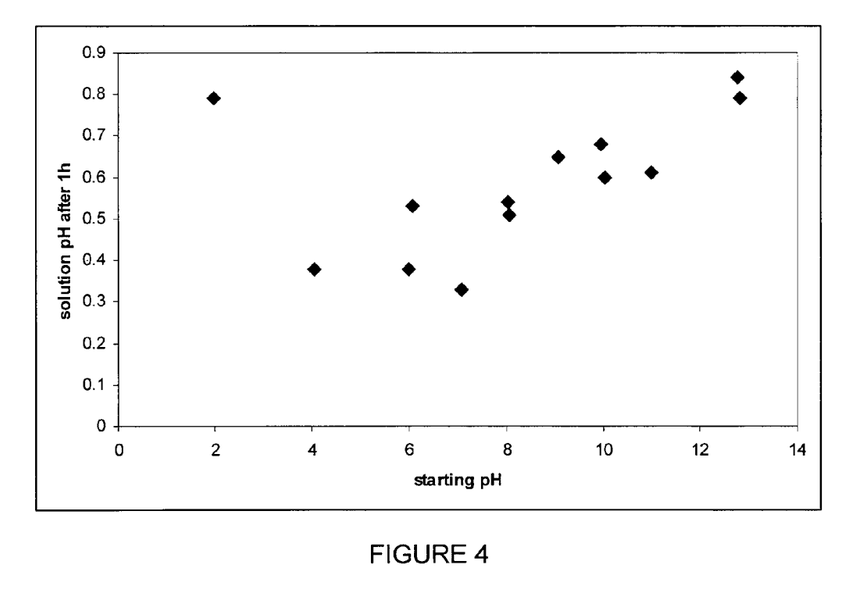
FIG. 4 is a graphical representation of the solution pH of the solutions of Example 1 after 1 hour.

The solution pH after 1 h is shown in FIG. 4. As can be seen, in all cases the pH is less than one, as for molybdenum recovery there is an anomalous point for a starting pH of 2. The oxidation of molybdenite results in the formation of protons which lower the solution pH such that the hypochlorite ion convert to hypochlorous acid and then chlorine. Despite the solution pH after 1 h being within the range where chlorine predominates the starting pH is of greater importance where dissolution is concerned.

The rapidity of the reaction between the molybdenite and oxidant is indicated by the majority of metal leached in solution after the first hour. It should be noted that oxidant remained in solution so the extent of reaction is not limited by oxidant consumption.

Example 2

Iodimetric titrations were performed on the starting and final solutions in Example 1 to determine the hypochlorous acid concentrations before and after reaction in order to measure the consumption.

The solutions had excess iodide ions added to be converted from iodide to iodine by oxidation:

$$2I^-+ClO^-+2H^+=I_2+H_2O+Cl^-$$

$$2I^-+HClO+H^+=I_2+H_2O+Cl^-$$

$$2I^-+Cl_2=I_2+2Cl^-$$

The iodine was then titrated using sodium thiosulphate of known concentration, the relevant reaction is:

$$I_2+2S_2O_3^{2-}\rightarrow 2I^-+S_4O_6^{2-}$$

Figure 5:
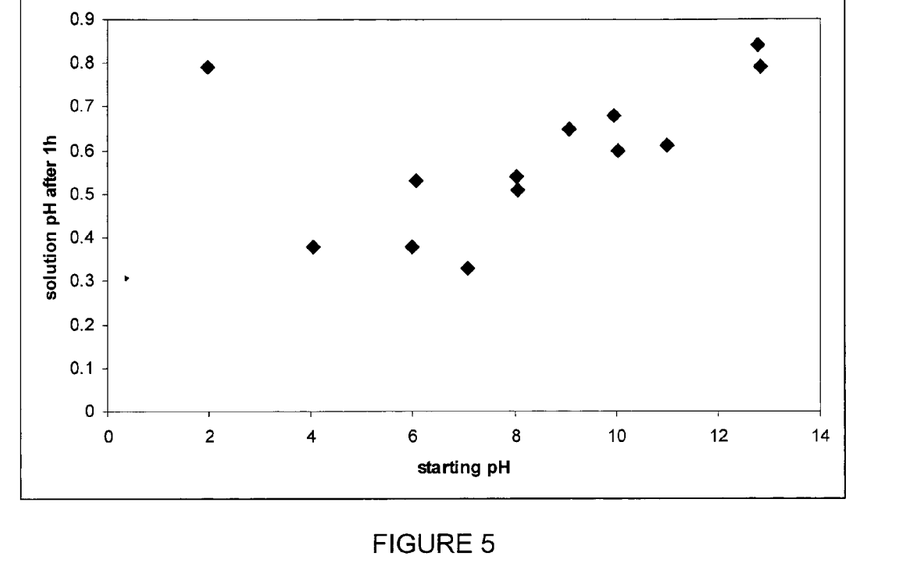
FIG. 5 is a graphical representation of molar consumption of oxidant per mole of molybdenum dissolved for the solutions of Example 2.

From these titrations the concentration of oxidant before and after reaction can be determined with consumption simply being the difference between them. The molar consumption of oxidant per mole of molybdenum dissolved is shown in FIG. 5.

Clearly, the lowest starting pH has the highest consumption, without wishing to be bound by theory, the inventors believe this is due to volatilisation of gaseous chlorine from the solution. The remaining data suggests that the higher the starting pH the lower the consumption. However, the spread of data requires further testing to confirm this. The average consumption for a starting pH of 8 and higher is 6.6 mol oxidant per mol of Mo dissolved. This is lower than the value of 9 for the reaction as indicated by Gupta (Extractive Metallurgy of Molybdenum, C. K. Gupta, CRC Press, 1992, p. 162)

$$9ClO^-+MoS_2+6H_2O=MoO_4^{2-}+2SO_4^{2-}+9Cl^-+6H^+$$

Clearly, there is a marked economic advantage over the prior art which showed higher consumption in addition to having to control the solution pH.

Example 3

Figure 6:
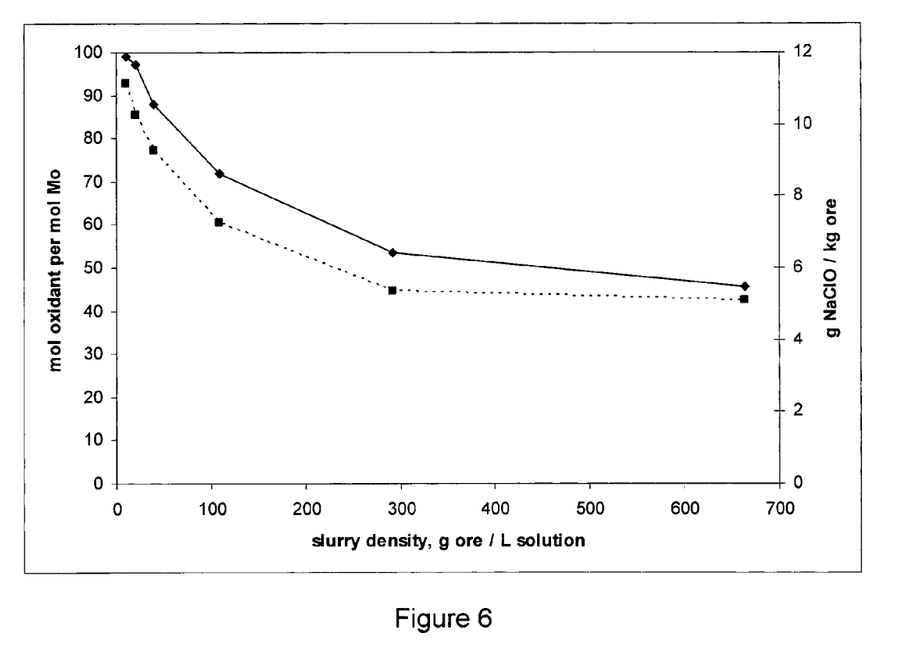
FIG. 6 is a graphical representation of the recovery in the solutions of Example 3 as a function of slurry density.

A molybdenum ore was obtained and the as-received sample was split, crushed and ring milled to a nominal P80 of 90 μm. Aqua regia digests performed in duplicate gave head grades of 0.051 and 0.056% Mo for an average of 0.053% Mo. Preliminary runs indicated that >99% molybdenum could be dissolved in 24 h. A series of runs was made using increasing slurry density. After 1 h a sample was taken for analysis:

FIG. 6 shows the recovery as a function of slurry density as the solid line. Clearly, high slurry densities result in reduced recoveries of molybdenum. The dashed line shows the volume of stock hypochlorite solution per gramme of ore. As can be seen these two lines have the same trend, this indicates that the reduced recovery is due to insufficient oxidant being present in the solution.

Figure 7:
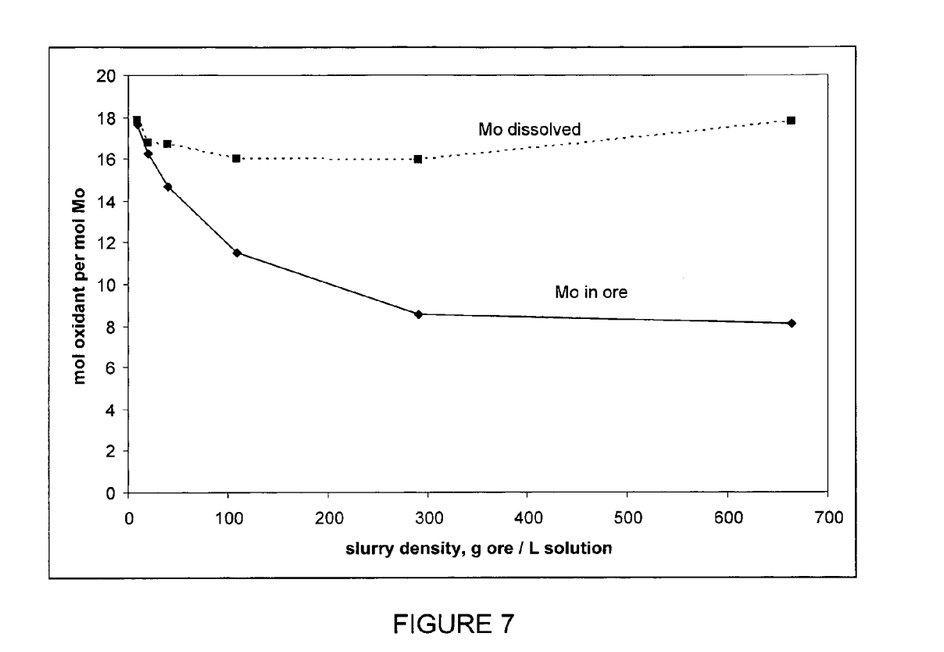
FIG. 7 is a graphical representation of the consumption of oxidant per mole of molybdenum in the ore and per mole of molybdenum in the solutions of Example 3.

From this data, the consumption of oxidant per mole of molybdenum in the ore and per mole of molybdenum dissolved can be calculated. These data are shown in FIG. 7. The oxidant per mole of molybdenum in solution (dashed line) is approximately constant and has an average of 16.9 moles of oxidant per mole of molybdenum dissolved. Clearly, the ratio is essentially constant for the dissolved molybdenum indicating that the higher slurry densities did not receive sufficient oxidant for complete dissolution of the molybdenum in the ore. The solid line shows the moles of oxidant per mole of Mo in the ore, other than for the two lowest slurry densities there is insufficient oxidant present.

This value is greater than the stoichiometric value of 9 from Gupta (Extractive Metallurgy of Molybdenum, C. K. Gupta, CRC Press, 1992, p. 162) and greater than the value of 6.6 determined for the concentrate in Example 2.

Without wishing to be bound by theory, the inventors believe that the increased consumption compared with other work is due to the presence of other minerals within the ore which also reacted with the oxidant.

Example 4

Figure 8:
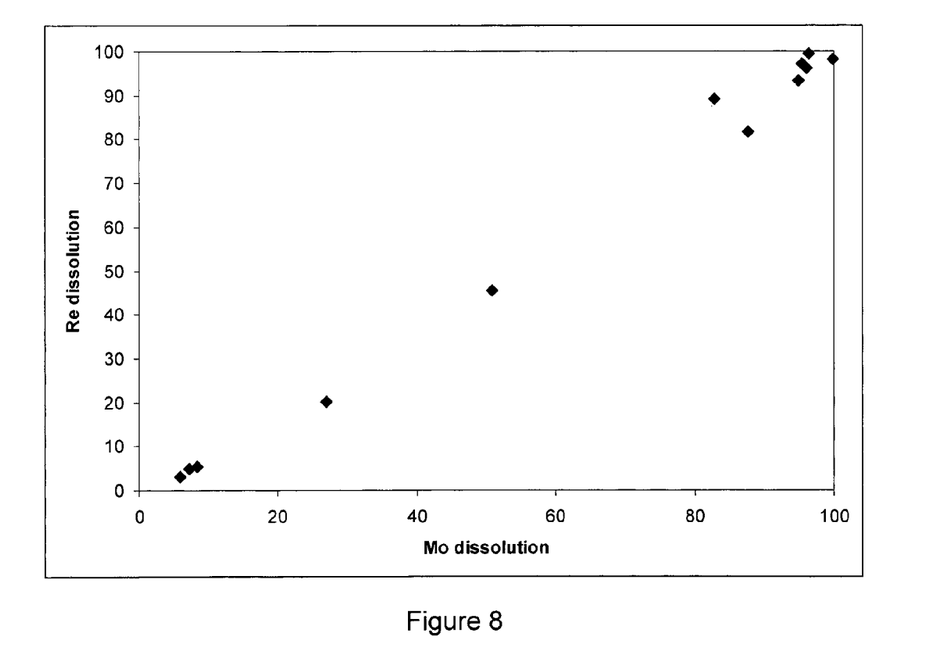
FIG. 8 is a graphical representation of the relationship between rhenium and molybdenum dissolutions of the solutions of Example 4.

The molybdenite concentrate from Example 1 was leached in oxidant solutions of differing concentration. Solution analyses were performed for both molybdenum and rhenium, the aim being to examine the relationship between the dissolution of the metals. FIG. 8 shows the relationship between rhenium and molybdenum dissolutions for a range of extents of dissolution. There is a very strong correlation between the rhenium and molybdenum dissolutions.

Without wishing to be bound by theory, the inventors believe that, as indicated by earlier authors, the rhenium is located within the structure of the molybdenite and dissolving the molybdenite also results in the rhenium dissolving. Has the two metals been in separate phases then such a strong relationship would not be likely as the two phases would need to behave the same towards the oxidant.

The claims defining the invention are as follows:

1. A method for leaching molybdenum and/or rhenium from a sulfide ore and/or concentrate containing such, the method comprising the steps of:
    exposing the ore and/or concentrate to an aqueous solution of chlorine-based oxidizing species, the aqueous solution having a pH and comprising hypochlorite and hypochlorous acid, wherein the sum of the concentration of the hypochlorite and hypochlorous acid in the aqueous solution is at least 10 mol % of the chlorine-based oxidizing species;
    allowing and/or facilitating oxidation of the molybdenum and/or rhenium by the hypochlorite and/or hypochlorous acid, thereby decreasing the pH such that the predominant chlorine-based oxidizing species becomes chlorine;
    allowing and/or facilitating the oxidation of the molybdenum and/or rhenium by the chlorine thereby producing a pregnant leach solution; and
    passing the pregnant leach solution to a means for metal recovery.

2. The method according to claim 1, wherein the step of exposing the ore and/or concentrate to an aqueous solution of chlorine-based oxidizing species in which the chlorine-based oxidizing species is hypochlorite or hypochlorous acid more specifically comprises:
exposing the ore and/or concentrate to an aqueous solution of chlorine-based oxidizing species in which at least 10 mol % of the chlorine-based oxidizing species is hypochlorite.

3. The method according to claim 2, wherein at least 50 mol % of the chlorine-based oxidizing species is hypochlorite.

4. The method according to claim 3, wherein hypochlorite ion comprises 99 mol % of the chlorine-based oxidizing species, on a molar basis.

5. The method according to claim 1, wherein the steps of:
exposing the ore and/or concentrate to an aqueous solution of chlorine-based oxidizing species in which the chlorine-based oxidizing species is hypochlorite or hypochlorous acid;
allowing and/or facilitating the oxidation of the molybdenum and/or rhenium by the hypochlorite and/or hypochlorous acid, thereby decreasing the pH such that the predominant chlorine-based oxidizing species becomes chlorine; and
allowing and/or facilitating the oxidation of the molybdenum and/or rhenium by the chlorine thereby producing a pregnant leach solution;
are performed at ambient temperature.

6. The method according to claim 1, wherein the steps of:
exposing the ore and/or concentrate to an aqueous solution of chlorine-based oxidizing species in which the chlorine-based oxidizing species is hypochlorite or hypochlorous acid;
allowing and/or facilitating the oxidation of the molybdenum and/or rhenium by the hypochlorite and/or hypochlorous acid, thereby decreasing the pH such that the predominant chlorine-based oxidizing species becomes chlorine; and
allowing and/or facilitating the oxidation of the molybdenum and/or rhenium by the chlorine thereby producing a pregnant leach solution;
are performed at atmospheric pressure.

7. The method according to claim 1, wherein the ore and/or concentrate exposed to the aqueous solution of chlorine-based oxidizing species in which the sum of the concentrations of hypochlorite and hypochlorous acid is at least 10 mol % of the chlorine-based oxidizing species is previously unleached.

8. The method according to claim 1 wherein the ore and/or concentrate exposed to the aqueous solution of chlorine-based oxidizing species in which the sum of the concentrations of hypochlorite and hypochlorous acid is at least 10 mol % of the chlorine-based oxidizing species is previously unoxidized.

* * * * *